United States Patent [19]

King et al.

[11] Patent Number: 4,926,104

[45] Date of Patent: May 15, 1990

[54] ADJUSTABLE SPEED AC DRIVE SYSTEM CONTROL FOR OPERATION IN PULSE WIDTH MODULATION AND QUASI-SQUARE WAVE MODES

[75] Inventors: Robert D. King, Schenectady; Paul M. Szczesny, Burnt Hills, both of N.Y.

[73] Assignee: General Electric Company, Schenectady, N.Y.

[21] Appl. No.: 423,169

[22] Filed: Oct. 18, 1989

[51] Int. Cl.$^5$ ............................................. H02P 5/34
[52] U.S. Cl. .................................... 318/599; 318/778; 318/799; 318/811
[58] Field of Search ............... 318/599, 767, 778, 779, 318/780, 798, 799, 800, 801, 808, 809, 810, 811, 812

[56] References Cited

U.S. PATENT DOCUMENTS 4,327,240  4/1982  Gdula et al. ........................ 364/721
4,777,578  10/1988  Jahns ..................................... 363/98

FOREIGN PATENT DOCUMENTS

3237779  4/1983  Fed. Rep. of Germany .

*Primary Examiner*—Bentsu Ro
*Attorney, Agent, or Firm*—Jill M. Breedlove; James C. Davis, Jr.; Marvin Snyder

[57] ABSTRACT

A polyphase AC motor drive system comprises an electric power inverter and control means which enables operation in, and allows smooth transition between, a current controlled PWM mode and a quasi-square wave mode of operation. At low motor speeds, the system operates in PWM mode. At higher speeds, above the corner point speed of the motor, the system operates in a quasi-square wave mode. Smooth transitions between modes of operation are controlled by a microcomputer which counts the number of current chops made by a switching device in a preselected phase leg of the inverter over a time interval that varies with the desired fundamental period of the motor current. As speed increases and approaches the corner point, the number of chops decreases below a first predetermined number, and the system transitions from PWM to quasi-square wave mode. As speed decreases, the number of chops increases above a second predetermined number (larger than the first), and the system transitions back to PWM mode. A motor speed command is limited by an adjustable clamp circuit, depending upon the DC link voltage, resulting in a robust drive that is not affected by utility brownouts or line transients.

22 Claims, 5 Drawing Sheets

ADJUSTABLE SPEED AC DRIVE SYSTEM CONTROL FOR OPERATION IN PULSE WIDTH MODULATION AND QUASI-SQUARE WAVE MODES

FIELD OF THE INVENTION

The present invention relates generally to controls for alternating current (AC) electric motor drives. More particularly, the present invention relates to a polyphase AC motor drive system including an electric power inverter which is operated in both a multiple pulse width modulation (PWM) mode and a square wave mode.

BACKGROUND OF THE INVENTION

Conventional pulse width modulation (PWM) electrical drive systems for polyphase AC motors operate in a voltage-controlled mode using a PWM triangulation method. According to such method, an isosceles triangle carrier wave is compared with a fundamental frequency modulating sine wave so that the points of intersection determine the switching instants of the inverter's switching devices. The modulation frequency is usually an integer multiple of the maximum fundamental frequency. Moreover, the carrier-modulation frequency ratio is generally selected to be a multiple of three in order to avoid triple-frequency related currents in the line.

Induction machines operating in the range from zero speed to the motor corner point speed are operating in what is characteristically referred to as the constant torque region; and, above the corner point speed, operation is in a reduced torque, constant power region (power being proportional to the product of motor speed and torque). Commercial drives which use a PWM triangulation method of operation have voltage limitations when operating near the corner point speed. Therefore, low cost PWM drives that use a fixed modulation or chopping frequency are usually limited to operation only in the constant torque region, and maximum speed is slightly less than the corner point speed. As a further limitation, such drives requires substantially constant DC link voltage and hence are not suitable for applications such as are common in the automotive and transportation industries, where the magnitude of DC link voltage can vary over a relatively wide range.

Known AC motor drive systems which operate over a wide speed range use relatively complex control techniques to smoothly transition from PWM mode in the constant torque region to square wave mode in the constant power region. In such drive systems, modulation frequency is decreased as motor speed approaches the corner point speed. Disadvantageously, voltage and current transients typically occur in the speed region near the corner point speed until the transition from PWM mode to square wave mode is complete.

Although vector-controlled drives are available which selectively control chopping frequency during the transition region, these drive systems are even more complex and expensive than those hereinabove described.

OBJECTS OF THE INVENTION

Accordingly, it is an object of the present invention to provide an improved AC motor drive system including an inverter which is operable in a current-controlled pulse width modulation mode or a voltage-controlled quasi-square wave mode.

Another object of the present invention is to provide an AC motor drive system including a control which enables the system to make smooth transitions from a PWM mode at low motor speeds to a quasi-square wave mode at speeds near or above the motor corner point speed, or when operating from a relatively low DC link voltage.

Still another object of the present invention is to provide a relatively simple and robust microcomputer-based AC motor drive system which is operable in a PWM mode or a quasi-square wave mode, the microcomputer control enabling the drive to make smooth transitions between both modes of operation.

Yet another object of the present invention is to provide a circuit for adjusting the limits of a hysteresis band in a hysteresis band current chopping regulation scheme.

SUMMARY OF THE INVENTION

The foregoing and other objects are achieved in a new and improved adjustable speed polyphase induction motor drive system including an electric power inverter having a plurality of phase legs connected in parallel between relatively positive and negative conductors of a direct current (DC) link, and a control which enables operation of the system in, and smooth transitions between, a current-controlled PWM mode and a voltage-controlled quasi-square wave mode. At low motor speeds, i.e. in the constant torque region, the system is operated in the PWM mode. At higher speeds above the motor corner point speed, i.e. in the constant power region, the system operates in the square wave mode.

Current regulation is achieved in the PWM mode by hysteresis band current chopping; that is, phase current is maintained within hysteresis limits of its desired waveform by periodically turning on and off the switching devices in each phase leg of the inverter during the conduction interval thereof. Chopping frequency of a particular switching device is defined herein as the number of current "chops" per cycle made by turning on and off the switching device multiplied by the fundamental frequency of motor current. The chopping frequency for a particular inverter phase leg is the sum of the chopping frequencies of the respective switching devices therein. Each device is controlled by chopping means which compares a corresponding phase current feedback signal with a reference AC waveform, normally representative of the desired phase current, and turns the device off or on as necessary to maintain the feedback signal within a hysteresis band of the reference waveform. During the PWM mode of operation, both the fundamental frequency and amplitude of the reference waveform are varied as desired, and the hysteresis band has a predetermined size.

Smooth transition from PWM to quasi-square wave modes is controlled by a microcomputer which counts the number of current chops made by one of the switching devices of a preselected inverter phase leg during a time interval equal to a preselected number of electrical cycles of the fundamental frequency of the reference AC waveform. When the number of chops decreases below a first predetermined number, transition to the quasi-square wave mode is simply accomplished by increasing the amplitude of the reference AC waveform to a constant level much higher than the maximum peak value of the current feedback signal and by significantly reducing the size of the hysteresis band.

Operation in the quasi-square wave mode at reduced motor speed or increased DC link voltage automatically results in an increased chopping frequency because of the increased voltage difference between the DC link and back EMF of the motor. When the number of chops per counting interval increases above a second predetermined number, which is preferably greater than the first predetermined number, the PWM mode is restored by reducing the reference waveform amplitude to its desired variable level and increasing the hysteresis band to its predetermined size.

As another aspect of the present invention, a variable motor speed command value is prevented from exceeding a limit that varies with the actual-to-rated ratio of the DC link voltage. (The term "rated DC link voltage" is defined herein as the maximum steady-state DC link voltage.) In this way, the drive system is prevented from establishing conditions for full power operation when the DC link voltage is relatively low.

A drive system control according to the present invention is useful, for example, in operating a fan for cooling a locomotive diesel engine.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
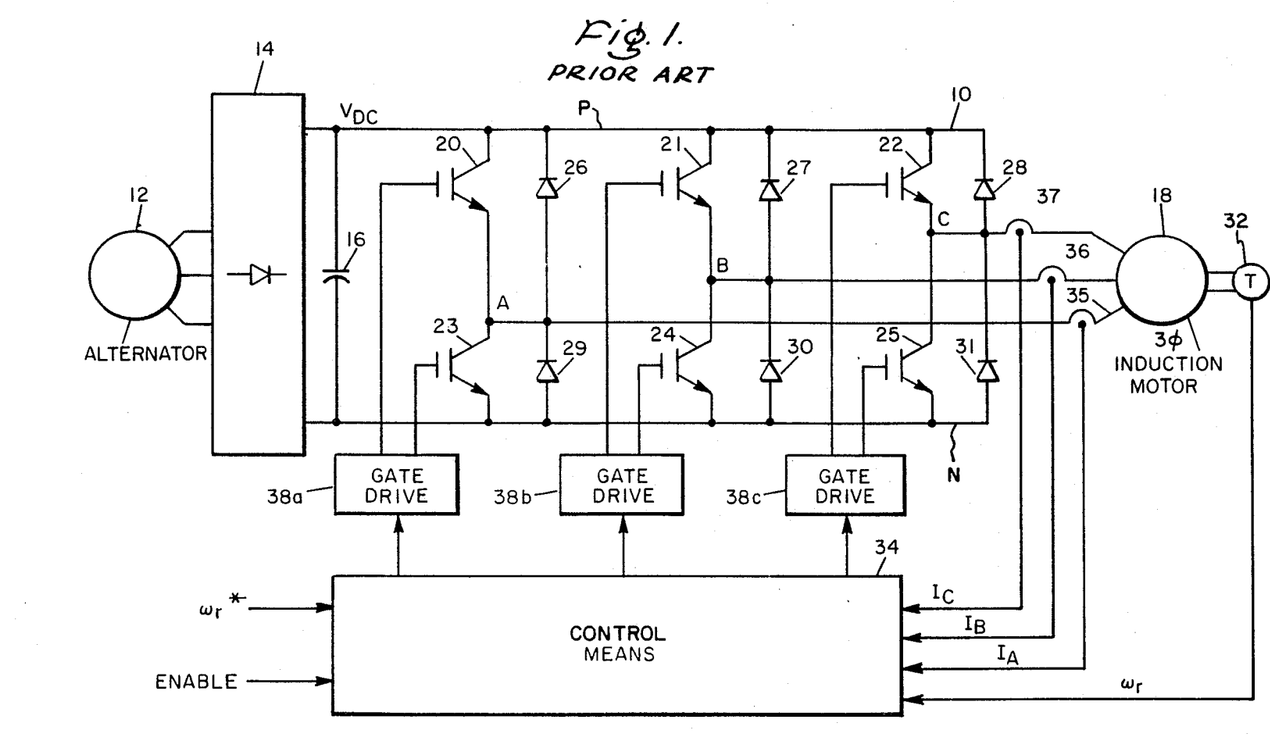
FIG. 1 is a schematic representation of a conventional induction motor drive system.

FIG. 1 illustrates a conventional adjustable speed induction motor drive system employing a full-wave bridge inverter 10. An alternator 12 provides DC electric power to the input of the drive system via a rectifier 14 and a DC link comprising first and second conductors P and N, the first conductor P having a potential that is positive with respect to that of the conductor N which may equal or be negative with respect to ground potential. Alternative power sources may comprise either a single-phase or a three-phase utility AC source, for example. Still another alternative power source may comprise a battery, in which case rectifier 14 is not required. In the illustrated embodiment, the alternator 12 is driven by a variable speed prime mover (not shown) to which its rotor is mechanically coupled, whereby the average magnitude of voltage $V_{DC}$ between the DC conductors P and N can vary over a wide range between zero and a predetermined maximum level (e.g., approximately 550 volts). DC link capacitance 16 is provided for smoothing the input DC link voltage and supplying AC current to the inverter. An LC filter (not shown) may also be used, if desired, as an additional rectifier filter.

Full-wave bridge inverter 10 is illustrated as a three-phase inverter for driving a three-phase induction motor 18. It is to be understood, however, that the principles of the present invention are not limited to three-phase systems, but apply equally well to systems having any number of phases. The inverter 10 has three parallel legs spanning the DC link conductors P and N. These legs respectively comprise upper electrical switching devices 20–22, connected in parallel with upper flyback diodes 26–28, respectively, and series-connected lower electrical switching devices 23–25, connected in parallel with lower flyback diodes 29–31, respectively. Switching devices 20–25 are illustrated as insulated-gate bipolar junction transistors (IGBTs), but other suitable current switching devices may be used; for example, field effect transistors (FETs), bipolar junction transistors (BJTs), gate turn-off thyristors (GTOs), MOS-controlled thyristors (MCTs), or Darlington power transistors. As shown, the three phase legs of the inverter include AC output terminals A, B and C, respectively, with each output terminal being located at the juncture of a different complementary pair of the switching devices for connection to the corresponding phase of induction motor 18.

As shown in FIG. 1, a speed sensor 32, such as a tachometer, is coupled to motor 18 for deriving a speed feedback signal $\omega_r$ representative of the actual angular velocity or speed of the motor. Known signal processing techniques in combination with a pulsed tachometer sensor could be employed to perform the function of tachometer 32, if desired. A suitable pulsed tachometer magnetic sensor that converts mechanical motion of a gear or other ferromagnetic toothed wheel to an electrical pulse train with frequency proportional to motor speed is a model DZ175SAN manufactured by Electro Corporation. Furthermore, other known signal processing techniques, such as the integration of signals obtained from flux coils, could be used to derive speed feedback signal $\omega_r$. The signal $\omega_r$ is one input to a control means 34. An operator command, such as a desired speed command value $\omega_r^*$, is a second input to the control means 34; however, another suitable control input signal, such as a variable torque command value, could be used instead. The control means 34 is also supplied with three phase current feedback signals $I_A$, $I_B$ and $I_C$ which are respectively derived from current sensors 35–37 associated with the three different phases of the motor 18. Alternatively, another embodiment comprises only two current sensors 35 and 36 for providing current feedback signals $I_A$ and $I_B$, respectively, and additional circuitry for calculating current feedback signal $I_C$ using Kirchoff's Current Law. Suitable current sensors are well-known in the art, such as: Hall effect current sensors; sensing resistors; sensing transformers; and current sensing transistors, such as those sold under the trademark SENSEFET by Motorola Corporation or those sold under the trademark HEX-Sense by International Rectifier Corporation. In a well-known fashion, such as described in commonly assigned U.S. Pat. No. 4,777,578 of T. M. Jahns, which patent issued on Oct. 11, 1988, and is hereby incorporated by reference, control means 34 periodically activates three gate drive circuits 38a, 38b and 38c, each of which is operative in turn to apply suitable turn-on and turn-off signals to the complementary pair of switching devices comprising the corresponding phase leg of the inverter 10. Suitable gate drive circuitry may comprise, for example, IR2110 bridge drivers manufactured by International Rectifier Corporation.

The control means 34 is suitably constructed and arranged to operate in a PWM mode to achieve motor current regulation by a method of hysteresis band current chopping. In general, the control generates a set of three reference AC waveforms each having controllable fundamental frequency and amplitude and being displaced in time from one another by one-third of their fundamental period. These waveforms are replicas of the desired sinusoidal three-phase motor currents. Each reference waveform has upper and lower hysteresis band limits to which the current feedback signal of the corresponding motor phase is continuously compared. During each positive half cycle of the phase A reference waveform, as current increases, the feedback signal $I_A$ will attain the upper limit of the hysteresis band, whereupon the upper switching device 20 is turned off. Consequently, phase A current transfers from the device 20 to the lower flyback diode 29 of the same phase leg and decreases. Feedback signal $I_A$ will soon attain the lower limit of the hysteresis band, at which time the control again turns on the upper switching device 20 and current transfers from the lower diode 29 to device 20. Similarly, during each negative half cycle of the phase A reference waveform, the lower switching device 23 and the upper flyback diode 26 provide the alternate phase A current paths for current chopping. The operation of the controls is similar for each of the other two phases. In this manner, the three current feedback signals are maintained within the hysteresis band of the reference AC waveforms by alternately turning on and off each of the switching devices in the respective phase legs of the inverter many times during each fundamental cycle, thereby chopping the corresponding phase current into a series of segments, the magnitudes of which alternately rise above and fall below the desired sine wave.

Figure 2:
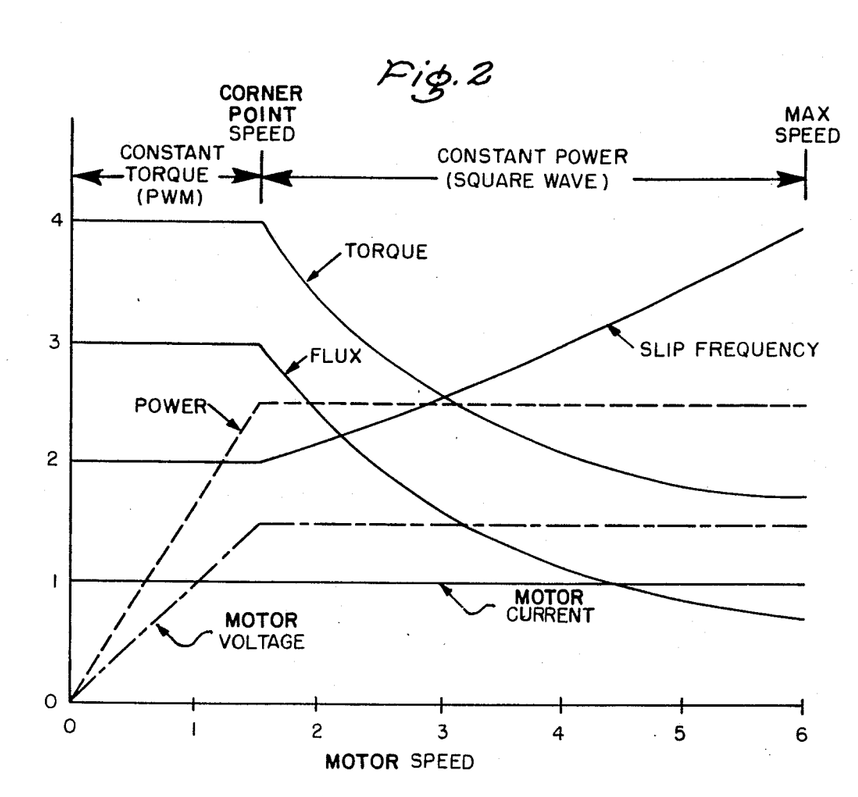
FIG. 2 is a graphical representation of the drive characteristics of the FIG. 1 system and the control strategy thereof.

FIG. 2 illustrates the desired characteristics of a typical adjustable speed AC motor drive system and the control strategy thereof. In particular, the characteristics are illustrated for the maximum level of DC link voltage $V_{DC}$ and a maximum torque envelope. Two distinct operating regions are shown: a constant torque region for motor speeds between zero and the corner point speed, and a constant power region for higher speeds. In the constant torque region, the system is operated in the current-controlled PWM mode, while the slip frequency, the current amplitude, the magnitude-to-frequency ratio of motor voltage (V/Hz), and consequently the motor flux are held constant. It is to be noted, however, that the current amplitude will be lower than the constant level shown in FIG. 2 when operating under conditions of less than maximum load torque. As shown in FIG. 2, the magnitudes of inverter output power and motor voltage vary linearly with motor speed for speed changes below the corner point speed. However, motor flux will decrease as motor speed increases above its corner point, and in this higher speed range it is desirable to operate the system in an unmodulated, square wave mode in order to maintain the maximum possible motor voltage. Ideally, in the square wave mode, each of the complementary pair of switching devices in each phase leg of the inverter 10 is turned on and off only once during each cycle of motor voltage, and now the fundamental amplitude of motor voltage is determined by the DC link voltage $V_{DC}$. The transition between current-controlled PWM mode and voltage-controlled quasi-square wave mode takes place in the vicinity of the corner point speed. It is to be noted that the corner point speed will be less than that shown in FIG. 2 when $V_{DC}$ is lower than its maximum level. As motor speed increases above its corner point, current amplitude is maintained constant by increasing the slip frequency; V/Hz and hence flux decrease, torque decreases, and the output power is held constant according to the expression: $T_e \omega_r = K$; where $T_e$ is torque output, $\omega_r$ is motor speed, and K is a constant.

Figure 3:
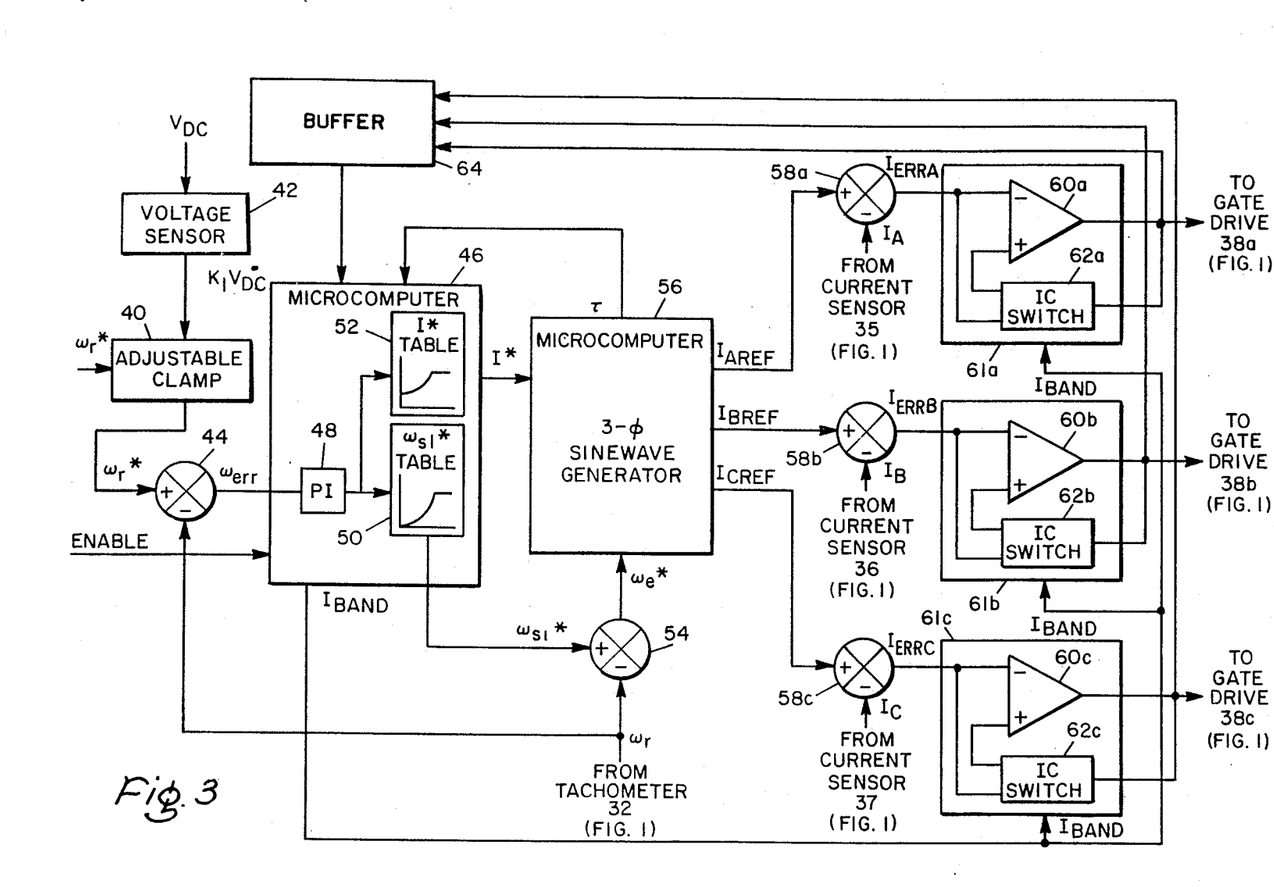
FIG. 3 is a functional block diagram of an AC motor drive in accordance with a preferred embodiment of the present invention.

FIG. 3 illustrates an improved control for an AC motor drive system in accordance with a preferred embodiment of the present invention. The external speed command $\omega_r^*$ is provided to an adjustable clamp circuit 40, and it can be varied as desired between zero and a predetermined maximum value corresponding to the high end of the speed range of the motor 18. A voltage feedback signal representative of the actual level of the average magnitude of DC link voltage $V_{DC}$ is derived from a suitable voltage sensor 42 connected between the DC link conductors P and N, such as a voltage-dividing network of resistors and operational amplifiers or an isolated voltage sense circuit, such as a type BB3650 manufactured by Burr-Brown Corporation or a type AD202 manufactured by Analog Devices, Inc. The resulting signal $K_1 V_{DC}$, which is proportional to DC link voltage $V_{DC}$, is also supplied to adjustable clamp circuit 40. In the adjustable clamp circuit, speed command $\omega_r^*$ is limited to a value that is less than its maximum value if the actual level of DC link voltage $V_{DC}$ is less than its maximum, or rated, level. More particularly, the variable speed command value at the output of the circuit 40 is prevented from exceeding a limit that is related to the maximum value of the external command by the actual-to-rated ratio of $V_{DC}$. In this way, the drive is prevented from establishing conditions for producing full power when the source voltage has a relatively low magnitude, i.e. during a utility brownout or when the alternator 12 is being driven at less than maximum speed. The construction of an adjustable clamp circuit is a matter well-known in the art which may be accomplished in a variety of ways.

The limited speed command value $\omega_r^*$ and the speed feedback signal $\omega_r$ from tachometer 32 are inputs to a summing means 44 for deriving a speed error value $\omega_{err}$ that varies with the difference between the respective input values. This error value is provided as an input to a microcomputer 46, such as an Intel type 8751. Although the adjustable clamp circuit 40 and the summing means 44 are illustrated as being external to the microcomputer 46, their respective functions alternatively could be implemented therein. Microcomputer 46 is programmed to include a gain and/or a compensation function 48, e.g. a proportional plus integral controller (PI), that stabilizes the response to changing speed error values.

The microcomputer 46 is programmed to perform a signal processing function which will provide two command values during both modes of operation. The first command value is a slip frequency command $\omega_{sl}^*$ that determines the desired slip frequency in the motor 18; preferably it is obtained from a slip look-up table 50 in which is stored the addresses or registers containing a series of values on a desired slip curve. This slip curve, which is illustrated in FIG. 3, defines the slip frequency required over a wide range of motor speeds in order for the motor to produce the desired torque while driving a given load. The other command value is an amplitude command signal I* that determines the desired fundamental amplitude of alternating current in the respective phases of the motors; preferably it is obtained from a current look-up table 52 containing a series of values on a desired current curve. During the PWM mode of operation, these command values are predetermined functions of the compensated speed error value $\omega_{err}$ and are variable. On the Other hand, during the quasi-square wave mode, although the command value $\omega_{s1}$* varies as a function of $\omega_{err}$ per the look-up table 50, command signal I* is constant.

Values in the slip and current amplitude look-up tables can be derived from the well-known per phase equivalent circuit of the AC induction motor or by constant V/Hz sine wave characterization tests of the motor and its associated load over the entire torque-speed plane. The maximum value of slip frequency and corresponding current amplitude value in the look-up tables are selected to produce a torque value in excess of the required maximum steady-state load torque in order to provide sufficient accelerating torque, even when operating near the AC motor corner point speed.

The slip look-up table 50 shown in FIG. 3 is representative of a one-quadrant drive, i.e. positive torque and forward direction. Regenerative (i.e., braking or negative torque) operation can be achieved by such a drive provided that the DC link can accept the regenerative power, e.g. if other loads share the same DC link or if the DC link is powered from a battery. Regenerative operation requires the slip look-up table 50 shown in FIG. 3 to be modified to contain negative values of slip frequency in response to negative speed error $\omega_{err}$ values. The current amplitude look-up table 52 likewise would have to be modified if regenerative operation is desired.

Slip frequency command value $\omega_{s1}$* is added to speed feedback signal $\omega_r$ by a summing means 54 to derive a fundamental frequency command value $\omega_e$* that varies with their sum. The latter value and the amplitude command value I* are supplied to a reference AC waveform generator 56 for providing three phase-displaced, but otherwise duplicate waveforms $I_{AREF}$, $I_{BREF}$ and $I_{CREF}$. These waveforms are replicas of the desired waveforms of the alternating currents in the three-phase stator windings of the induction motor 18 during the PWM mode of operation. Preferably, they are sine waves, but alternatively, they could have other predetermined shapes such as trapezoidal. The frequency of each of the reference waveforms is determined by the frequency command value $\omega_e$*, and it equals the desired fundamental frequency of motor current. The amplitude of each waveform is determined by the amplitude command value I*, and during the PWM mode of operation, it corresponds to the desired fundamental amplitude of motor current. A preferred implementation of reference current waveform generator 56 involves a microcomputer, such as an Intel 8751 microprocessor, and a 12-bit, 4-channel digital-to-analog converter (not shown) to provide a controllable frequency, controllable amplitude, three-phase reference sine wave generator. Such a polyphase reference generator is described in commonly assigned U.S. Pat. No. 4,327,240 of M. Gdula, R. J. Hodsoll and E. C. Underkoffler, issued on Apr. 27, 1982, which is hereby incorporated by reference.

Reference AC waveforms $I_{AREF}$, $I_{BREF}$, and $I_{CREF}$ are respectively compared in summers 58a, 58b and 58c to current feedback signals $I_A$, $I_B$, and $I_C$. The latter signals are representative of the instantaneous magnitudes of currents in the respective phases of the motor 18. The difference or error values $I_{ERRA}$, $I_{ERRB}$ and $I_{ERRC}$ derived by these summers are supplied to corresponding inverting inputs of bistable comparators 60a, 60b and 60c, respectively, of controllable hysteresis circuits 61a, 61b and 61c. The hysteresis circuits preferably include integrated circuit (IC) switches 62a, 62b and 62c, respectively. Each of the hysteresis circuits receives an analog hysteresis band signal $I_{BAND}$ from microcomputer 46 for setting the upper and lower limits of the earlier mentioned hysteresis band. An output signal from such a hysteresis circuit has either a low ("0") or a high ("1") state, changing from one to the other whenever the comparator detects that a positive error value at its inverting input has increased to the prescribed limit and returning to its original state whenever the prescribed limit is reached by a negative error value. The output signals from the circuits 61a, 61b and 61c are respectively applied to gate drive circuits 38a, 38b and 38c. Each time there is a certain state change (e.g., 0-to-1) at the output of one of the hysteresis circuits 61a, 61b and 61c, the corresponding gate drive circuit will apply a turn-on signal to a selected one of the upper and lower switching devices in the associated phase leg of the inverter 10, and each time there is an opposite state change, a turn-off signal is applied to the same device.

Figure 4:
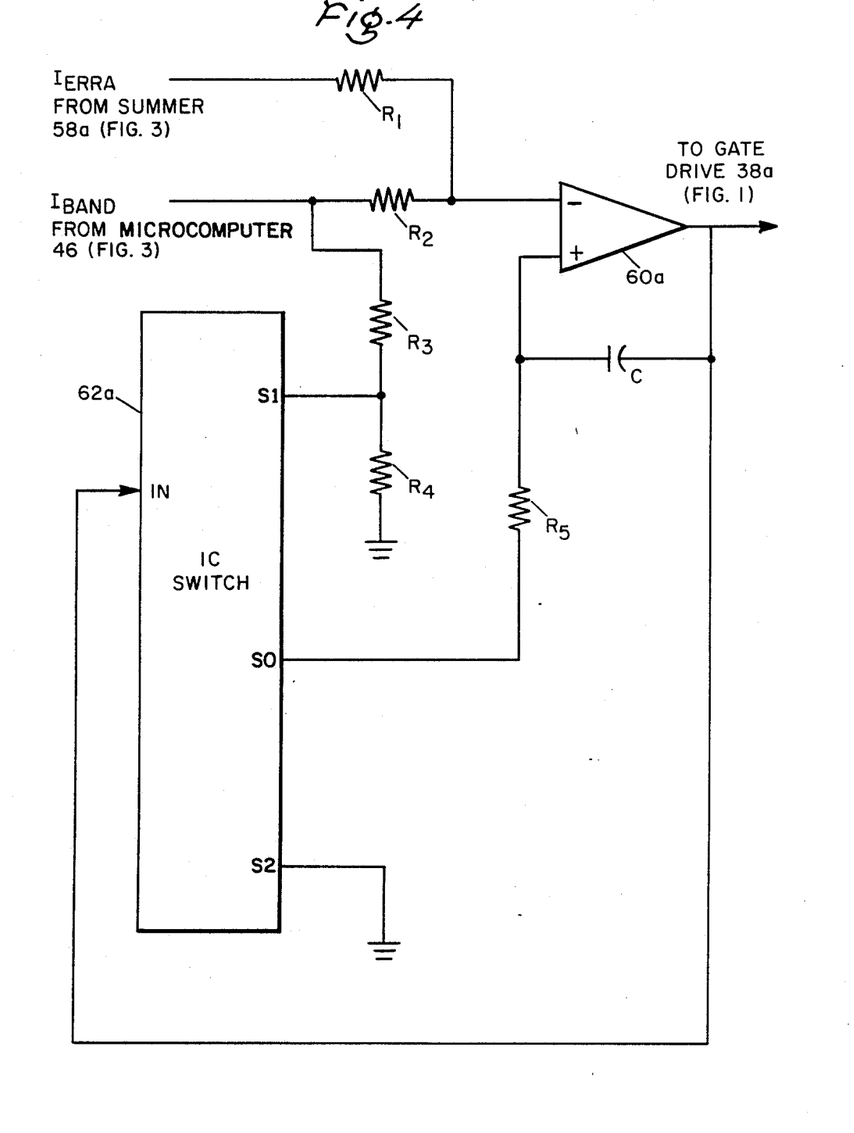
FIG. 4 is circuit diagram illustrating a preferred implementation of a controllable hysteresis circuit according to the present invention.

FIG. 4 is an illustration of a preferred implementation of a controllable hysteresis circuit in accordance with the present invention. Operation of such a hysteresis circuit will be described with specific reference to phase A, i.e. circuit 61a, since the construction and operation of circuits 61a, 61b and 61c are similar. Output signal $I_{ERRA}$ from summer 58a is supplied to the inverting input of comparator 60a through a resistor $R_1$; and hysteresis band signal $I_{BAND}$ from microcomputer 46 is supplied to the inverting input of comparator 60a through a resistor $R_2$. The output logic level signal from comparator 60a is supplied to gate drive circuit 38a (as shown in FIG. 1) and to the input IN of switch 62a. Preferably, switch 62a comprises a single-pole-double-throw (SPDT) bipolar analog switch, such as a type AD7512DI dielectrically insulated CMOS switch manufactured by Analog Devices. A capacitor C is connected between the output of comparator 60a and the non-inverting input thereof. An output S0 of switch 62a is connected to the non-inverting input of comparator 62a through a resistor $R_5$. An output S1 of switch 62a is connected to the inverting input of comparator 60a via a voltage-dividing network of resistors comprising resistors $R_3$ and $R_4$. An output S2 of switch 62a is grounded.

When the phase A current error signal $I_{ERRA}$ attains the upper limit of the hysteresis band, the output signal from comparator 60a changes from a high to a low logic level. At this point, a turn-off signal is applied to the upper switching device 20 (as shown in FIG. 1). As a result, phase A current will now transfer from device 20 to the flyback diode 29 and decrease in magnitude during its positive half cycle. For this case, the output S0 of switch 60a is connected to ground via output S2.

The output of comparator 60a transitions to a high logic level signal when the lower limit of the hysteresis band is attained, i.e, when:

$$I_{ERRA} < \frac{R_1}{R_2} \times (-I_{BAND})$$

At this point, a turn-off signal is applied to the device 23, and after an appropriate delay time to avoid shoot-through (i.e. both devices 20 and 23 being turned on simultaneously), device 20 is again turned on. As a result, the phase A current will transfer from diode 29 to device 20 and increase in magnitude. For this case, the output signal from comparator 60a controls analog switch 62a such that output S0 is connected to output S1, thereby providing resistor network $R_3$ and $R_4$ between signal $I_{BAND}$ and ground. Resistor divider network $R_3$ and $R_4$ thus provides a signal having a value equal to a fraction of the signal $I_{BAND}$ to outputs S0 and S1 of switch 62a. Resistors $R_1$ and $R_5$ preferably have equal resistance values. Resistor $R_2$ is typically larger than resistor $R_1$. In general the values of resistors $R_1$, $R_2$, $R_3$ and $R_4$ depend on the values of signals $I_{ERRA}$ and $I_{BAND}$, in particular, their scale factors in amps/volt. Furthermore, resistors $R_3$ and $R_4$ are selected to enable the controllable hysteresis circuit to toggle whenever a positive $I_{ERRA}$ increases above $+I_{BAND}$ and to produce an opposite comparator response whenever a negative $I_{ERRA}$ decreases below $-I_{BAND}$ (i.e., a fraction thereof according to the hereinabove equation), where $+I_{BAND}$ and $-I_{BAND}$ are the upper and lower limits of the hysteresis band, respectively.

During each negative half cycle, the lower switching device 23 and the upper flyback diode 26 provide the alternate phase A current paths for current chopping. The operation of the controllable hysteresis circuit is thus identical for both the positive and negative half cycles.

During the PWM mode of operation, each hysteresis circuit changes states more than twice each half cycle of the corresponding reference waveform, and consequently, there are a plurality of phase current "chops" per half cycle. The maximum chopping frequency $f_{max}$ may be expressed as:

$$f_{max} = \frac{V_{DC}}{4LI_{BAND}},$$

where L is the motor leakage inductance and $I_{BAND}$ is the height of the hysteresis band. Moreover, the chopping frequency $f_c$ of a phase leg, i.e. the sum of the chopping frequencies of each respective switching device thereof, may be expressed as:

$$f_c = f_{max}\left[1 - \left(\frac{E_c}{V_{DC}}\right)^2\right],$$

where $E_c$ is the back EMF of the motor. Hence, assuming a constant DC link voltage $V_{DC}$ and a predetermined $I_{BAND}$ as motor speed increases, $E_c$ also increases and chopping frequency $f_c$ decreases. Once the corner point speed is reached, it is desirable to change operating modes from PWM to square wave. In accordance with the present invention, the size of the hysteresis band and the amplitude of the reference waveforms are used to change the mode of operation, as will now be described in detail.

As shown in FIG. 3, the output signals from the controllable hysteresis circuits are applied through a buffer circuit 64 to microcomputer 46. The microcomputer is programmed to count the number N of current chops caused by the upper switching device in the inverter leg connected to one motor phase, e.g. phase A, responding to the alternate turn-on and turn-off signals that are applied by the associated gate drive circuit as the corresponding hysteresis circuit (e.g., 61a) changes states during a time interval that varies with the fundamental period of the reference AC waveforms, i.e., the length of time $\tau$ between successive positive-going zero crossings of the phase A reference waveform $I_{AREF}$. Signals marking the ends of each period $\tau$ of any one of the reference current waveforms are supplied to the counter in the microcomputer 46 from the reference waveform generator 56. Preferably the time interval for counting current chops equals two periods $2\tau$.

Figure 5:
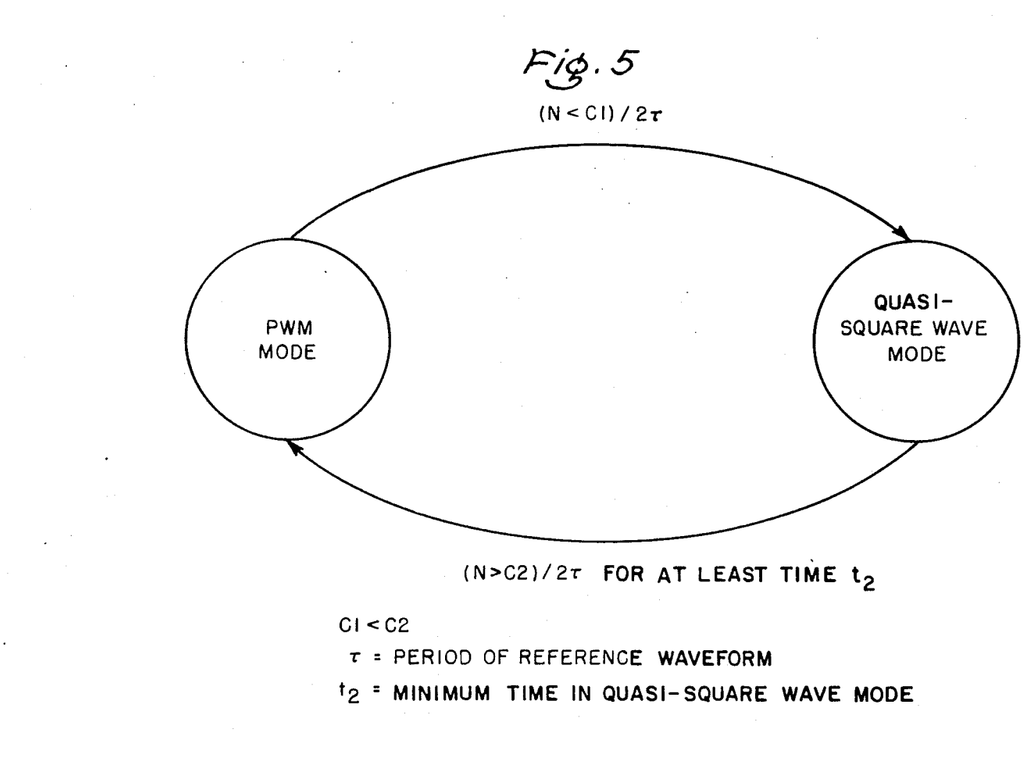
FIG. 5 is a sequence diagram illustrating transitions between modes of operation according to a preferred embodiment of the present invention.

In the preferred embodiment of the present invention, the microcomputer 46 is programmed to control transitions between PWM and square wave modes of operation in accordance with the algorithm illustrated in FIG. 5. As explained above, the number N of phase A current chops per time interval $2\tau$ are counted. In response to N decreasing below a first predetermined number C1, transition from the PWM mode to a new mode is achieved by increasing the variable amplitude command value I* to relatively high constant value corresponding to a reference waveform amplitude at least 20% higher than the peak value that the phase current feedback signals will have whenever $V_{DC}$ and motor current are at rated conditions. At the same time, the microcomputer is effective to reduce the hysteresis band signal, thereby reducing $I_{BAND}$ from the predetermined size established during the PWM mode to a significantly smaller size (e.g., one-half the predetermined size). Due to the increased command value I* and reduced signal $I_{BAND}$ in the new mode of operation, each of the summers 58a, 58b and 58c of the chopping means will derive a positive error value that remains above the prescribed limit throughout most of each half cycle of the corresponding reference waveform. In other words, each current feedback signal will now be under the hysteresis band of the corresponding reference waveform except in the vicinity of its zero crossings where the controllable hysteresis circuit will change states in the same manner as described above for the PWM mode. Because of the extra current chops near the edges of each half cycle of the reference AC waveform, especially when the fundamental frequency is relatively low or when the motor current amplitude is relatively high, the new mode of operation is called a "quasi-square wave" mode. For many applications, the extra chops will not materially hinder the performance of the motor drive system at speeds above the corner point speed of the motor, and the quasi-square wave mode is an acceptable approximation of a true square wave mode. Operation could be in a true square wave mode for some applications if the amplitude of the reference waveform were high enough to avoid the extra chops.

When operating in the quasi-square wave mode, as motor speed and $E_c$ decrease or $V_{DC}$ increases, the number N of current chops per time interval $2\tau$ will increase. According to the transition algorithm, as illustrated in FIG. 5, the system reverts to its PWM mode in response to N increasing above a second predetermined number C2, where C2 is greater than C1, after it has been operating in the quasi-square wave mode for at least a given minimum length of time $t_2$ (e.g., 0.2 seconds). The microcomputer 46 includes a timing function programmed to prevent any mode change of the chopping means during the interval $t_2$ after each change from quasi-square wave to PWM modes (and, preferably, also after each change from PWM to quasi-square wave modes). In order to restore the PWM mode, the hysteresis band $I_{BAND}$ is increased to its former predetermined size and the amplitude command value I* is decreased to a normal value determined by the look-up table 52. State oscillations between PWM and square wave modes are prevented by proper selections of numbers C1 and C2 and time $t_2$. The values of C1 and C2 for a particular application depend upon the hysteresis band signal $I_{BAND}$ used in PWM and quasi-square wave modes.

Microcomputer 46 also preferably comprises start-up and shut-down software for disabling the normal inverter controls while microcomputer 46 is being started or if faults are detected. Moreover, during start-up and at low motor speeds, i.e. speeds below about 20% of maximum, transition to square wave mode is disabled to ensure proper operation of the drive system.

While the preferred embodiments of the present invention have been shown and described herein, it will obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An electrical drive system for an adjustable speed polyphase AC motor, comprising:
   a source of DC electric power including first and second conductors;
   a full-wave inverter including a plurality of parallel phase legs connected between said first and second conductors, each of said phase legs including an AC output terminal for connection to a different phase of said motor, upper and lower switching devices, and upper and lower flyback diodes, said upper switching device and said upper flyback diode being connected in parallel relationship between said first conductor and said AC output terminal, and said lower switching and said lower flyback diode being connected in parallel relationship between said AC output terminal and said second conductor;
   a plurality of current sensing means for deriving current feedback signals representative of the instantaneous magnitudes of currents in the respective phases of said motor;
   reference waveform generating means for providing a plurality of reference AC waveforms normally representative of the desired currents in the respective motor phases, said waveforms having controllable fundamental frequency and amplitude;
   chopping means associated with said generating means for turning on and off said upper and lower switching devices in each leg of said inverter so that each current feedback signal is normally maintained within a hysteresis band of the corresponding reference waveform by alternately decreasing and increasing the phase current magnitude as the feedback signal attains upper and lower limits of said hysteresis band during the conduction interval of the corresponding motor phase; and
   control means for selectively controlling the operation of said chopping means in either a PWM mode or a quasi-square wave mode, said control means including means for counting the number of current chops caused by the turning on and off of a preselected one of said switching devices during a time interval that varies with the period of one of said reference waveforms, said control means changing the operation of said chopping means from PWM to quasi-square wave modes in response to said number of current chops decreasing below a first predetermined number and from quasi-square wave to PWM modes in response to said number of current chops increasing above a second predetermined number.

2. A system according to claim 1 wherein said generating means is so arranged that the fundamental amplitude of each of said reference AC waveforms is controlled by a variable amplitude command value, and wherein said control means is effective during said PWM mode of operation to vary said command value as a function of the desired fundamental amplitude of motor current and is alternatively effective during said quasi-square wave mode of operation to cause said command value to equal a relatively high constant value.

3. A system according to claim 2 wherein said power source is so constructed and arranged that the average magnitude of voltage between said first and second conductors is variable over a wide range, and wherein said high constant value corresponds to a reference waveform amplitude of at least 20% higher than the peak value that said current feedback signals will have when said voltage magnitude is relatively high and motor current is maximum.

4. A system according to claim 2 wherein said control means also is effective during said PWM mode to establish a predetermined size of said hysteresis band and is alternatively effective during said quasi-square wave mode to cause said hysteresis band to be significantly smaller than said predetermined size.

5. A system according to claim 2 wherein said reference AC waveforms are sine waves.

6. A system according to claim 1 wherein said first predetermined number of current chops is less than said second predetermined number of current chops.

7. A system according to claim 1 wherein said control means includes timing means for preventing any mode change of said chopping means for a predetermined length of time after each change from PWM to quasi-square wave modes of operation.

8. A system according to claim 7 wherein said timing means also prevents any mode change for said predetermined length of time after each change from quasi-square wave to PWM modes.

9. A system according to claim 1 wherein said power source is so constructed and arranged that the average magnitude of voltage between said first and second conductors is variable between a relatively low level and a predetermined maximum level, wherein the fundamental frequency and amplitude of said reference waveforms are controlled by said control means as functions of a variable speed command value, and further comprising:
   voltage sensing means for deriving a voltage feedback signal representative of the actual level of said voltage; and
   clamping means responsive to said voltage feedback signal for preventing said speed command value from exceeding a limit that varies with the ratio of said actual level to said maximum level.

10. A system according to claim 1 wherein said chopping means comprises a plurality of comparator means for comparing the respective reference current waveforms to the current feedback signals representing the corresponding phase currents.

11. A system according to claim 1 and further comprising:
speed sensing means for deriving a speed feedback signal representative of the actual motor speed;
first summing means for deriving a speed error value that varies with the difference between a variable speed command value and the value of said speed feedback signal;
signal processing means responsive to said speed error value for providing a variable slip frequency command value that is a predetermined function of said speed error value; and
second summing means for deriving a fundamental frequency command value that varies with the sum of said slip frequency command value and the value of said speed feedback signal;
said signal processing means also being effective to provide a variable fundamental amplitude command value which, during said PWM mode of operation, is another predetermined function of said speed error value, and said generating means being so arranged that the fundamental amplitude and frequency of each of said reference AC waveforms are controlled by said amplitude command value and said fundamental frequency command value, respectively.

12. A system according to claim 11 wherein said control means is effective, during said quasi-square wave mode of operation, to cause said amplitude command value to equal a relatively high constant value.

13. A system according to claim 11 wherein said control means and said signal processing means comprise a microcomputer.

14. A system according to claim 13 wherein said microcomputer includes a current amplitude look-up table and a slip frequency look-up table for providing said amplitude command value and said slip frequency command value, respectively.

15. A method for controlling an adjustable speed polyphase AC motor drive including an inverter, said inverter comprising a plurality of parallel phase legs connected between first and second conductors of a source of DC electric power, each of said phase legs including an AC output terminal for connection to a different phase of said motor, upper and lower switching devices, and upper and lower flyback diodes, said upper switching device and said upper flyback diode being connected in parallel relationship between said first conductor and said AC output terminal, and said lower switching device and said lower flyback diode being connected in parallel relationship between said AC output terminal and said second conductor, the steps of said method comprising:
sensing the instantaneous magnitude of current through each respective phase leg of said inverter and producing a current feedback signal representative thereof;
providing a plurality of reference AC waveforms normally representative of the desired currents in the respective motor phases, said waveforms having controllable fundamental frequency and amplitude;
turning on and off said upper and lower switching devices in each leg of said inverter so as to normally maintain each current feedback signal within a hysteresis band of the corresponding reference waveform by alternately decreasing and increasing the phase current magnitude as the feedback signal attains upper and lower limits of said hysteresis band during the conduction interval of the corresponding motor phase;
counting the number of current chops caused by the turning on and off of a preselected one of said switching devices during a time interval that varies with the period of one of said reference waveforms; and
selectively controlling the operation of said inverter in either a PWM mode or a quasi-square wave mode including changing from PWM mode to quasi-square wave mode in response to said number of current chops decreasing below a first predetermined number and changing from quasi-square wave mode to PWM mode in response to said number of current chops increasing above a second predetermined number.

16. The method according to claim 15 further comprising the step of:
controlling the amplitude of each of said reference AC waveforms using a variable amplitude command value, said method further comprising varying said command value during said PWM mode as a function of the desired fundamental amplitude of motor current, and setting said command value equal to a relatively constant value during said quasi-square wave mode.

17. The method according to claim 15 further comprising the step of:
preventing any mode change for a predetermined length of time after each change from PWM to quasi-square wave of operation.

18. The method according to claim 17 further comprising the step of:
preventing any mode change for said predetermined length of time after each change from quasi-square wave to PWM modes.

19. The method according to claim 15 further comprising the steps of:
establishing a predetermined size of said hysteresis band during said PWM mode; and
decreasing the size of said hysteresis band during said quasi-square wave mode so that it is significantly smaller than said predetermined size.

20. The method of claim 15 further comprising the steps of:
sensing voltage across said first and second conductors and deriving a voltage feedback signal representative of the actual level of said voltage, the average magnitude of said voltage being variable between a relatively low level and a predetermined maximum level;
controlling the fundamental frequency and amplitude of said reference waveforms as functions of a variable speed command value; and
preventing said speed command value from exceeding a limit that varies with the ratio of said actual level to said maximum level of said voltage.

21. A hysteresis band current chopping control for a full-wave inverter in a polyphase AC motor drive system including a plurality of parallel phase legs connected between first and second conductors of a source of DC electric power, each of said phase legs including an AC output terminal for connection to a different phase of said motor, upper and lower switching devices, and upper and lower flyback diodes, said upper switching device and said upper flyback diode being connected in parallel relationship between said first conductor and said AC output terminal, and said lower switching device and said lower flyback diode being connected in parallel relationship between said AC output terminal and said second conductor, said hysteresis band current control being operable in a PWM mode and a quasi-square wave mode and comprising:

a plurality of current sensing means for deriving current feedback signals representative of the instantaneous magnitudes of currents in the respective phases of said motor;

reference waveform generating means for providing a plurality of reference AC waveforms normally representative of the desired currents in the respective motor phases, said waveforms having controllable fundamental frequency and amplitude; and a plurality of summing means for deriving a current error signal for each respective motor phase that varies with the difference between the corresponding values of the current feedback signal and the reference waveform;

controllable hysteresis circuit means associated with said generating means for providing a hysteresis band having upper and lower limits being varied as functions of a variable hysteresis circuit means including chopping means for turning on and off said upper and lower switching devices in each leg of said inverter so that each current feedback signal is normally maintained within the hysteresis band of the corresponding reference waveform by alternately decreasing and increasing the corresponding phase current magnitude as the feedback signal attains said upper and lower limits of said hysteresis band during the conduction interval of the corresponding motor phase;

said chopping means comprising a plurality of comparator means for comparing the respective current error signals with the hysteresis band signal, said hysteresis band signal having a positive value corresponding to said upper limit and a negative value corresponding to said lower limit, each said comparator means generating a first logic level signal when the respective current error signal increases to said positive value and generating a second logic level signal when the respective current error signal decreases to said negative value; and said hysteresis circuit means further comprising switch means associated with each said comparator means for providing said negative value of said hysteresis band signal to the respective comparator means in response to the output signal thereof changing from said second logic level to said first logic level and for providing said positive value of said hysteresis band signal to the respective comparator means in response to the output signal thereof changing from said first logic level to said second logic level.

22. The hysteresis band current control of claim 21 wherein said upper and lower limits of each respective hysteresis band are substantially symmetrical about the corresponding reference waveform.

* * * * *